Patented Aug. 4, 1942

2,292,022

UNITED STATES PATENT OFFICE 2,292,022

TREATMENT OF GELATIN

Edward F. Christopher, Chicago, Ill., assignor to Industrial Patents Corporation, Chicago, Ill., a corporation of Delaware No Drawing. Application November 23, 1938, Serial No. 242,110

6 Claims. (Cl. 260—117)

This invention relates to a method for increasing the viscosity of gelatin.

This application is a continuation in part of my application entitled Treatment of gelatin, Serial No. 117,031, filed December 21, 1936.

One of the objects of the invention is to increase the viscosity of gelatin.

Another object of the invention is to improve the whipping qualities of gelatin.

Other objects of the invention will be apparent from the description and claims which follow.

It is known that the viscosity of gelatin may be increased by heating and that the increase of viscosity which results from heating is secured at the expense of jelly strength.

I have found that the viscosity may be increased with consequent improved whipping properties without substantial loss in bloom by heating gelatin to temperatures below the boiling point of water, preferably to a temperature of the order of but below 95 degrees centigrade since at the lower temperatures viscosity may be increased with a minimum loss of bloom, provided the heating is done in the presence of ethyl alcohol.

In the preferred procedure for carrying out the present invention, the gelatin is refluxed with grain ethyl alcohol for relatively extended periods. I have found, for example, that gelatin refluxed with grain ethyl alcohol for a period of twenty-four hours had a bloom of 213 and a viscosity of 67 as compared with the control sample jelly strength of 229 and viscosity of 40.

I have also found that the beneficial effect of treatment with ethyl alcohol is not a mere function of the heating treatment since in one test against the same control I precipitated gelatin from a gelatin solution added to ethyl alcohol and secured a bloom of 245 and a viscosity of 45.

In the foregoing tests the grain ethyl alcohol which was employed had a concentration of 95 per cent.

I have found that when gelatin is precipitated in alcohol or dry gelatin is refluxed with ethyl alcohol, the gelatin contains some hydrolytic products such as amino acids and peptones which are soluble in alcohol, and are removed from the gelatin which improves the quality of the gelatin.

In carrying out the refluxing process, it is preferable to employ a calcium chloride drying tube in order to prevent the alcohol from absorbing moisture from the air and thus reducing its concentration and effectiveness.

It will be seen, therefore, that I have discovered that the viscosity of gelatin may be imprvoed without substantial loss in jelly strength by treating with ethyl alcohol either by refluxing dry gelatin in ethyl alcohol or by precipitating gelatin from solution by adding the solution to ethyl alcohol.

I claim:

1. The method of treating gelatin to increase the viscosity of the gelatin which comprises refluxing gelatin in the presence of grain ethyl alcohol for a sufficient period of time to substantially increase the viscosity of the gelatin.

2. The method of treating gelatin to increase the viscosity of the gelatin without substantially decreasing the bloom which comprises heating dry gelatin in the presence of grain ethyl alcohol to a temperature approaching but below 95 degrees C. and maintaining the dried gelatin at such temperature for a sufficient period of time to increase the viscosity of the gelatin.

3. The method of treating gelatin to increase the viscosity of the gelatin without substantially decreasing the bloom which comprises refluxing dry gelatin in grain ethyl alcohol at a temperature approaching but below 95 degrees C. for about twenty-four hours.

4. The method of treating gelatin to increase the viscosity without substantially reducing the bloom of the gelatin which comprises refluxing gelatin in grain ethyl alcohol for a sufficient period of time to substantially increase the viscosity.

5. The method of treating gelatin to increase the viscosity of the gelatin which comprises heating dry gelatin in the presence of grain ethyl alcohol for a sufficient period of time to substantially increase the viscosity of the gelatin.

6. The method of treating gelatin to increase the viscosity of the gelatin which comprises refluxing dry gelatin in grain ethyl alcohol for about 24 hours.

EDWARD F. CHRISTOPHER.